(12) United States Patent
Hattori

(10) Patent No.: US 6,855,558 B1
(45) Date of Patent: Feb. 15, 2005

(54) PACKAGE WITH LOCKING MECHANISM

(75) Inventor: Keita Hattori, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/793,835

(22) Filed: Mar. 8, 2004

(30) Foreign Application Priority Data

Sep. 24, 2003 (JP) ......................................... 2003-331989

(51) Int. Cl.[7] ............................................... H01R 13/62
(52) U.S. Cl. ......................... 436/160; 439/372; 385/53; 385/92
(58) Field of Search ................................. 439/160, 157, 439/159, 358, 372; 385/53, 92

(56) References Cited

U.S. PATENT DOCUMENTS

| | | | |
|---|---|---|---|
| 3,629,791 A | * 12/1971 | Normann ..................... | 439/342 |
| 3,836,938 A | * 9/1974 | Barrett et al. ............... | 439/157 |
| 5,666,266 A | * 9/1997 | Katoh et al. ................. | 361/684 |
| 5,901,263 A | * 5/1999 | Gaio et al. ..................... | 385/92 |
| 6,439,918 B1 | 8/2002 | Togami et al. .............. | 439/372 |
| 6,533,603 B1 | * 3/2003 | Togami ....................... | 439/372 |
| 6,692,159 B2 | * 2/2004 | Chiu et al. .................... | 385/53 |
| 6,778,399 B2 | * 8/2004 | Medina et al. .............. | 439/372 |
| 6,793,517 B2 | * 9/2004 | Neer et al. ................... | 439/372 |

* cited by examiner

Primary Examiner—Briggitte R. Hammond
(74) Attorney, Agent, or Firm—McGinn & Gibb, PLLC

(57) ABSTRACT

A package with a locking mechanism provided with a package main body to be inserted into and removed from a cage and locked fastenably and releasably with the cage, a locking-dislocking mechanism for locking and dislocking the package main body with the cage, and an operation lever for the locking-dislocking mechanism wherein the locking-dislocking mechanism is attached to the package main body, the operation lever has a plurality of members to be pivoted detachably on the package main body, and any one of the members to be pivoted which is selected arbitrarily therefrom is pivoted on the package main body so as to rotate the operation lever.

10 Claims, 17 Drawing Sheets

PACKAGE WITH LOCKING MECHANISM

The present application is based on Japanese patent application No. 2003-331989, the entire contents of which are incorporated herein by reference.

BACKGROUND OF THE INVENTION

1. Field of the Invention

The present invention relates to a package for optical communication such as a module for optical transmission and reception, and more particularly to a package with a locking mechanism which is attached to a cage in an exchangeable manner.

2. Description of the Related Art

A package for optical communication is located between an optical fiber and communication equipment. Such package functions to convert optical signals received through an optical fiber into electrical signals and transmits the electrical signals converted to a side of communication equipment, or to convert electrical signals from communication equipment into optical signals and transmits the optical signals converted to the side of the optical fiber. The package is detachable with respect to an optical fiber and communication equipment for the replacement thereof so as to cope with possible troubles in optical elements or electric elements inside the package or to match specifications for communication (optical wavelength, modulation system, communication speed and the like) with that of the parties to be communicated.

A package 40 shown in FIG. 1 is disclosed in U.S. Pat. No. 6,439,918 B1 (see FIG. 1, FIG. 3B, and FIG. 4). The package 40 has a socket port (not shown) for inserting into and removing from an optical fiber connector (not shown) and composed of a package main body 42 to be inserted into a cage 41 in an insertable manner, a lever 43 attached swingably to the package main body 42, a locking section 44 provided with one end of the lever 43 and coming in and out to a side of the cage 41, and an operation lever 45 for swing the lever 43 disposed rotatably on the package main body 42.

The operation lever 45 is constituted to contain an engagement member 46 extending diametrically from a revolving center to be engaged with a side of the other end of the lever member 43 and in such that the engagement member 46 pushes the side of the other end of the lever 43 by rotating the engagement member, whereby the locking section 44 is allowed to retract to a side of the package main body 42.

It is to be noted that a dimensional standard of the cage 41 (a dimension, and a position of latch for engagement with the locking section 44) is specified in a standard common in respective makers.

In the meantime, the packages 40 are disposed vertically in multiple stages close to communication equipment (not shown) so as to be capable of wiring integrally optical fibers. In such a case, since the operation lever 45 is arranged to be dislocked by pulling a pull tab 47 disposed at a prescribed position. Accordingly, sometimes it is hard to pull the handle 47 due to a layout and the like of components in a package, resulting in difficulty for dislocking the package. In this respect, a "back to back" wiring manner wherein packages 40 are mounted invertedly with a back to back relationship is proposed to improve operationality in dislocking a package. In this case, however, optical fiber connectors must be also invertedly wired, so that there is a problem of making wiring work more difficult.

SUMMARY OF THE INVENTION

Accordingly, it is an object of the present invention to solve the above-described problem, and to provide a package with a locking mechanism which can be easily dislocked without changing a posture for inserting the package into the cage.

In order to achieve the above-described object, a package with a locking mechanism according to the present invention comprises a package main body to be inserted into and removed from a cage and locked fastenably and releasably with the cage, a locking-dislocking mechanism for locking and dislocking the package main body with the cage, and an operation lever for the locking-dislocking mechanism, the locking-dislocking mechanism being attached to the package main body, the operation lever having a plurality of members to be pivoted detachably on the package main body wherein any one of the members to be pivoted which is selected arbitrarily therefrom being pivoted on the package main body so as to rotate the operation lever.

In the package with the locking mechanism according to the present invention, the member to be pivoted is composed of a shaft functioning as the center of rotation in the operation lever, and the package main body has a retaining groove for retaining releasably the shaft in the diametrical direction thereof.

In the package with the locking mechanism according to the present invention, the retaining grooves are formed into circular arc or hooked sections being curved in a turned relationship, respectively.

In the package with the locking mechanism according to the present invention, a notched section for hooking the shaft in the groove by a user's finger is defined on the package main body.

In the package with the locking mechanism according to the present invention, the member to be pivoted is configured in the form of a grooved section surrounding the shaft attached to the package main body in a releasable manner along the diametrical direction thereof.

In the package with the locking mechanism according to the present invention, the grooved sections are formed into circular arc or hooked sections being curved in a turned relationship, respectively.

In the package with the locking mechanism according to the present invention, the operation lever has a latch engaged with the package main body when the operation lever rotates about the shaft, and the package main body has a reception groove for guiding the latch so as to maintain the center of rotation in the operation lever.

The package with the locking mechanism according to the present invention comprises further an engagement lever locked fastenably and releasably to the cage to be disposed rotatably to the package main body, and an adjusting member to be attached to the operation lever, the adjusting member rotating the engagement lever so as to release from the cage when the operation lever is tilted, wherein the operation lever is pivoted tiltably in a direction of taking out the package main body.

In the package with the locking mechanism according to the present invention, the adjusting member is rotatably linked at a position defined between the members to be pivoted in the operation lever, and the adjusting member is engaged slidably with the engagement lever.

The package with the locking mechanism according to the present invention, the package can be easily dislocked from a cage.

BRIEF DESCRIPTION OF THE DRAWINGS

The present invention will be explained in more detail in conjunction with appended drawings, wherein.

DESCRIPTION OF THE PREFERRED EMBODIMENTS

A preferred embodiment of the present invention will be described in detail hereinafter by referring to the accompanying drawings.

Figure 1:
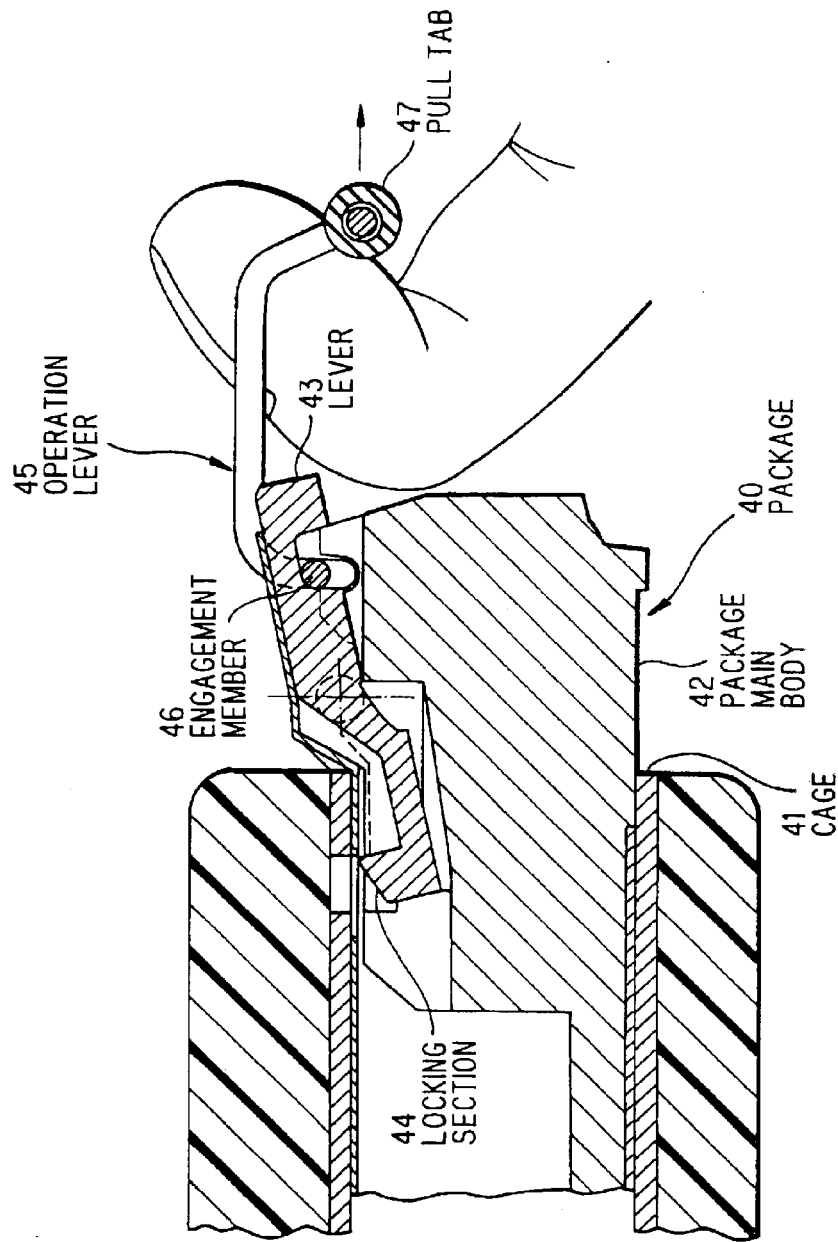
FIG. 1 is a side sectional view showing a conventional package with a locking mechanism.
Figure 2:
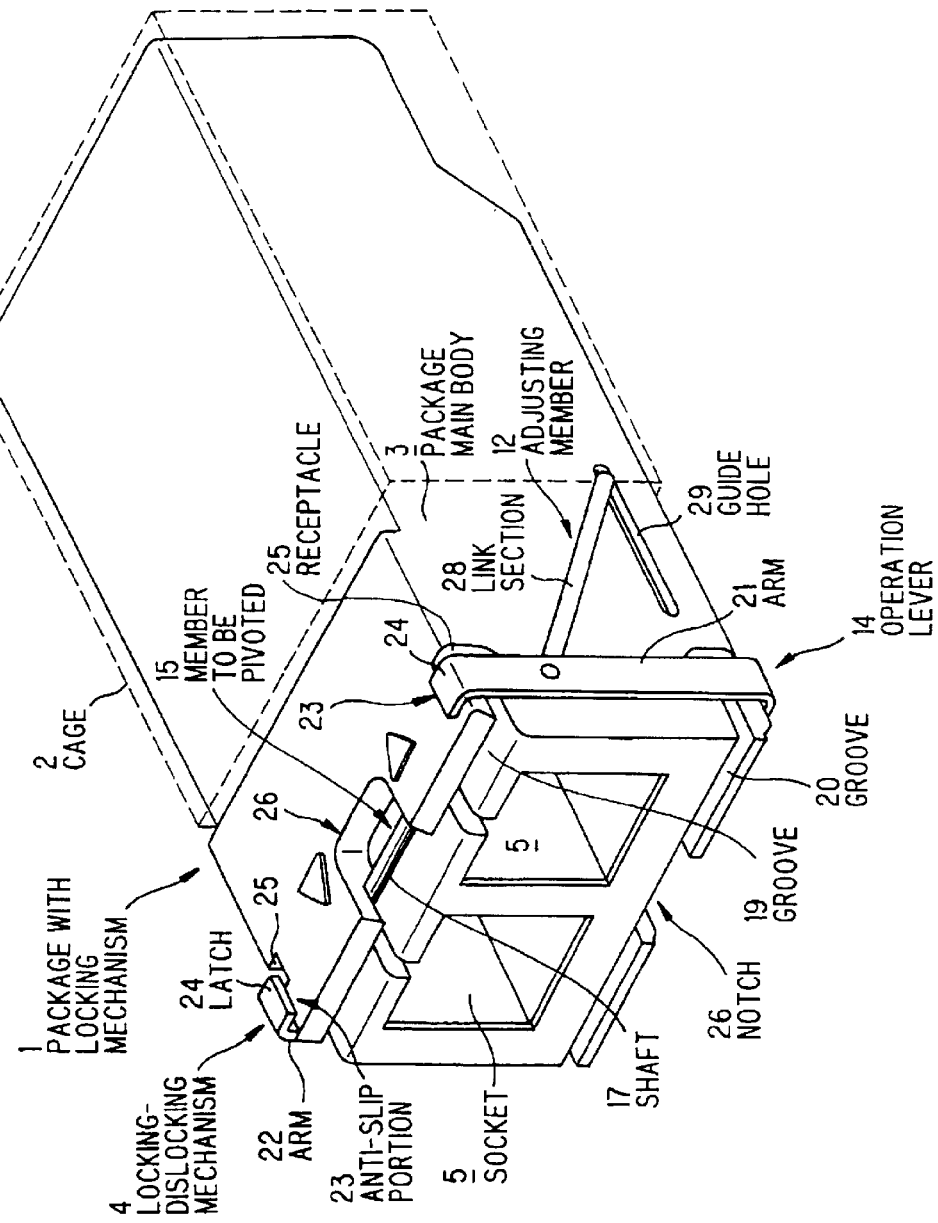
FIG. 2 is a perspective view showing a package with a locking mechanism according to a preferred embodiment of the present invention.
Figure 3:
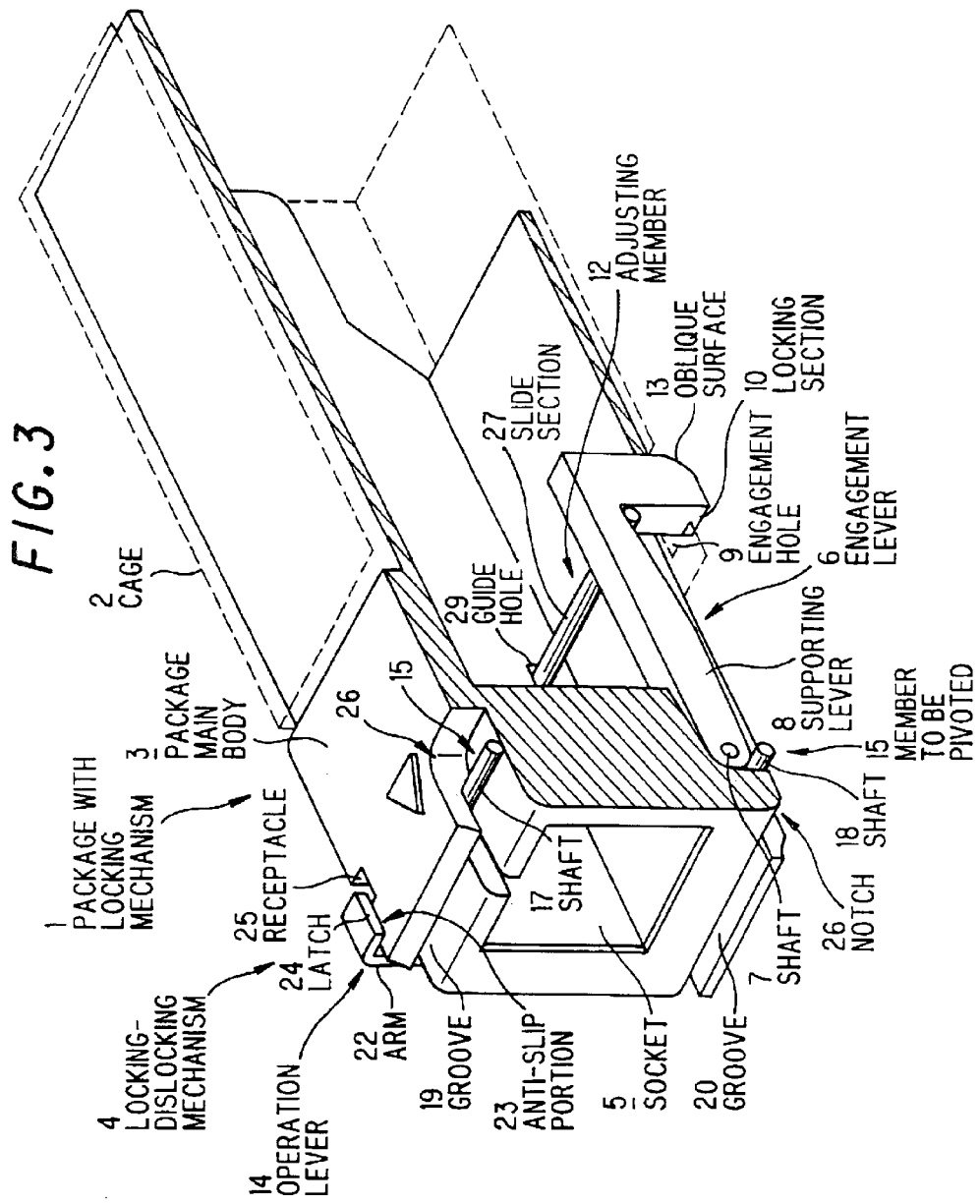
FIG. 3 is a perspective view showing the package with the locking mechanism, in section, of FIG. 1.
Figure 4:
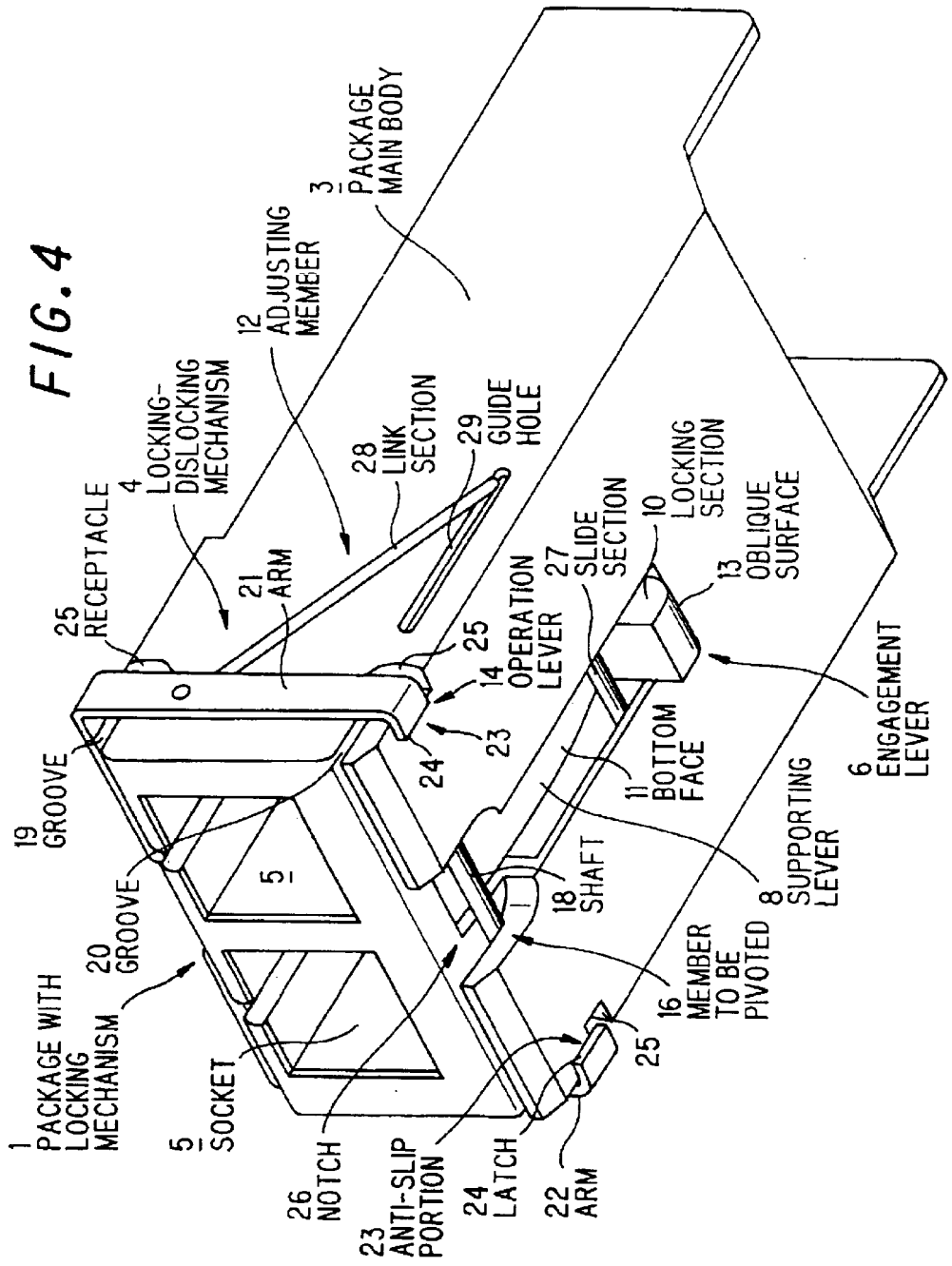
FIG. 4 is a perspective view showing the package with the locking mechanism.
Figure 5:
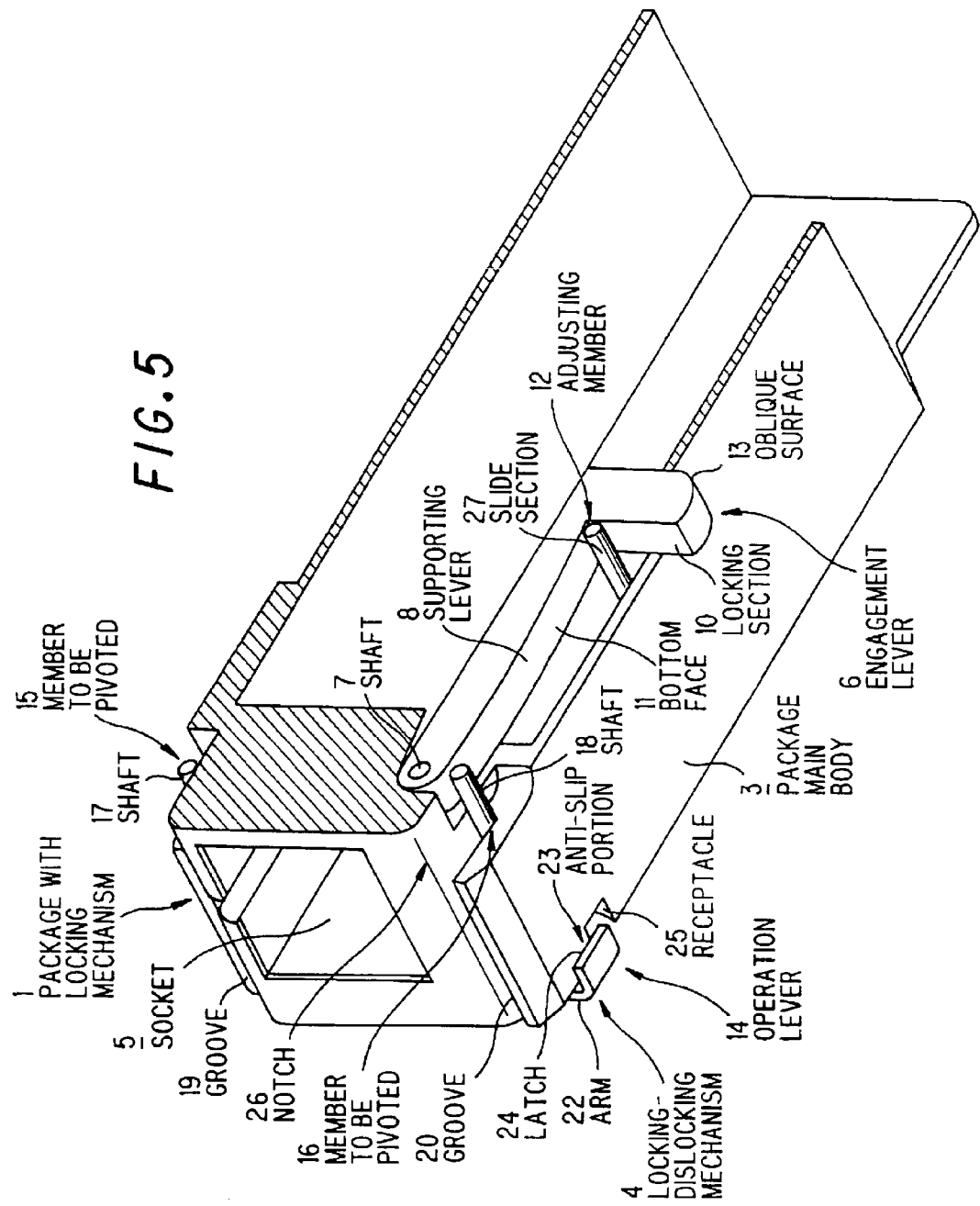
FIG. 5 is a perspective view showing the package with the locking mechanism, in section, of FIG. 3.

FIGS. 2 and 4 are perspective views each showing a condition where a package with a locking mechanism is fitted to a cage represented by a broken line, while FIGS. 3 and 5 are perspective views each showing the package with locking mechanism in a cut-off state along the axis thereof.

As shown in FIGS. 2 and 4, the package with locking mechanism 1 is insertably inserted into the cage 2, and composed of a package main body 3 locked releasably with the cage 2, and a locking-dislocking mechanism 4 for locking and dislocking the package main body 3 and the cage 2.

The package main body 3 is formed in a long substantially rectangular parallelepiped contour along its longitudinal direction (insert and removal direction), and has sockets 5 for detachably connecting optical fiber connectors (not shown) at the front end (the removal end) thereof.

On one hand, as shown in FIGS. 3 and 5, an engagement lever 6 for locking and dislocking the cage 2 and the package main body 3, which functions to lock lockably and removably with the cage 2, is disposed rotatably on the bottom of the package main body 3. The engagement lever 6 is composed of a supporting lever 8 disposed rotatably around a shaft 7 horizontal to the package main body 3, and a locking section 10 formed integrally with the supporting lever 8 and inserted removably into an engagement hole 9 defined on the cage 2 by rotating vertically the supporting lever 8. The supporting lever 8 is disposed so as to extend longitudinally, and the front end thereof is pivoted on the package main body 3. Furthermore, a bottom surface 11 of the supporting lever 8 is formed to have a curved configuration wherein the bottom surface rises with approaching a rear portion thereof so as to ride on a slide section 27 of an adjusting member 12 which will be mentioned later. The locking section 10 extends downwards from the rear end of the supporting lever 8. An extreme end of the locking section 10 is configured into an oblique plane wherein it rises with approaching a rear portion thereof, whereby it escapes upwards when the cage 2 comes into contact therewith.

As shown in FIGS. 2 and 3, the locking-dislocking mechanism 4 is composed of the operation lever 14 mounted rotatably on the package main body 3, and the adjusting member 12 which is mounted rotatably to the operation lever 14 and supported slidably by the package main body 3 to adjust the engagement lever 6, whereby the engagement lever 6 is swingingly moved.

The operation lever 14 has two members to be pivoted 15 and 16 detachably to the package main body 3, respectively. The operation lever 14 is constituted in such that either of the selected arbitrarily sections to be pivoted 15 and 16 is allowed to be pivoted by the package main body 3 to rotate the selected section. The member to be pivoted 15 is composed of a shaft 17 for forming a rotating center of the operation lever 14, and the member to be pivoted 15 is retained in a groove 19 so as to be detachable in its diametrical direction of the shaft 17. On the other hand, the section to be pivoted 16 is composed of a shaft 18 for forming a rotating center of the operation lever 14, and the member to be pivoted 16 is retained in a groove 20 so as to be detachable in its diametrical direction of the shaft 18.

More specifically, the operation lever 14 has a pair of right and left arms 21 and 22 which are placed on the opposite sides of the front of the package main body 3, respectively, wherein the shafts 17 and 18 are mounted to the respective arms 21 and 22 so as to be in parallel to each other. In this condition, the operation lever 14 is adapted to be pivoted in a tiltable manner along a direction in removing the package main body 3 by means of either of the shafts 17 and 18.

Furthermore, anti-slip portions 23 are formed on both the arms 21 and 22 in the respective opposite positions, respectively, so as to prevent slipping thereof from the package main body 3 when either of the shafts 17 and 18 is disengaged with either of the grooves 19 and 20. Specifically, the anti-slip portion 23 is a latch 24 extending towards inside of the package along its width direction at an end of the arm 21 or 22. The latch 24 is adapted to engage with a receptacle 25, which will be described hereunder, in the package main body 3 when the arms 21 and 22 are rotated about either of the shafts 17 and 18 as the center of rotation.

The receptacles 25 are defined at the opposite positions on both sides of the package main body 3. The receptacle 25 functions to receive a latch 24 moving in a circular arc locus when the operation lever 14 is rotated around either of the shafts 17 and 18. In other words, the receptacle 25 functions to receive a latch 24 so as to hold a position of either of the shafts 17 and 18, whereby the receptacle 25 guides either of the shafts 17 and 18 being the center of rotation of the operation lever 14 so as not slip the shaft 17 or 18 off from either of the groove 19 and 20.

The grooves 19 and 20 are defined on the front end surface of the package main body 3 in such that they are spaced vertically and extend in their width directions of the package main body 3, respectively. The grooves 19 and 20 are defined in the form of circular arc sections which are curved in a turned direction with each other so as either of the shafts 17 and 18 to be released from either of the grooves 19 and 20 in only when either of the shafts 17 or 18 retained in either of the grooves is allowed to rotate around the other shaft 18 or 17.

Moreover, a notched portion 26 is defined on the package main body 3 so as to make user's finger possible to pick up either of the shafts 17 and 18 retained in either of the grooves 19 and 20. Such notched portions 26 are defined on the front upper and lower ends of the package main body 3 so as to communicate with the grooves 19 and 20, respectively.

The adjusting member 12 rotates the engagement lever 6 so as to allow the engagement lever 6 to disengage with or slip out from the cage 2 when the operation lever 14 is inclined. The adjusting member 12 is linked rotatably to a position defined between the sections to be pivoted 15 and 16 in the operation lever 14 and engaged slidably with the engagement lever 6. The adjusting member 12 is supported slidably on the package main body 3 in a longitudinal direction thereof. The adjusting member 12 is composed of the slide section 27 for pushingly rotating the supporting lever 8 of the engagement lever 6, and a link section 28 linked rotatably to the operation lever 14 as well as also to a slide section 27 for operating together a slide section 27 to slide it when the operation lever 14 rotates.

The slide section 27 is formed in a rod-shape extending in its width direction of the package 1, and the opposite ends thereof project through guide holes 29 defined on the opposite side surfaces of the package main body 3 outside thereof. The guide hole 29 guides sliding of the slide section 27 and is defined extendingly in the longitudinal direction of the package. Furthermore, the slide section 27 is placed on the under side of the supporting lever 8 in the engagement lever 6 so as to receive the supporting lever 8. In these circumstances, when the slide section 27 slides forwards, the engagement lever 6 is rotated upwards, while when the slide section 27 slides rearwards, the engagement lever 6 is permitted to descend.

An end of the link section 28 is linked rotatably at an intermediate position of either of the arms 21 and 22 in the operation lever 14. The link sections 28 are constituted so as to slide the slide section 27 even when the operation lever 14 is rotated around either of the shafts 17 and 18.

In the following, operations of embodiments of the present invention will be described.

Figure 12:
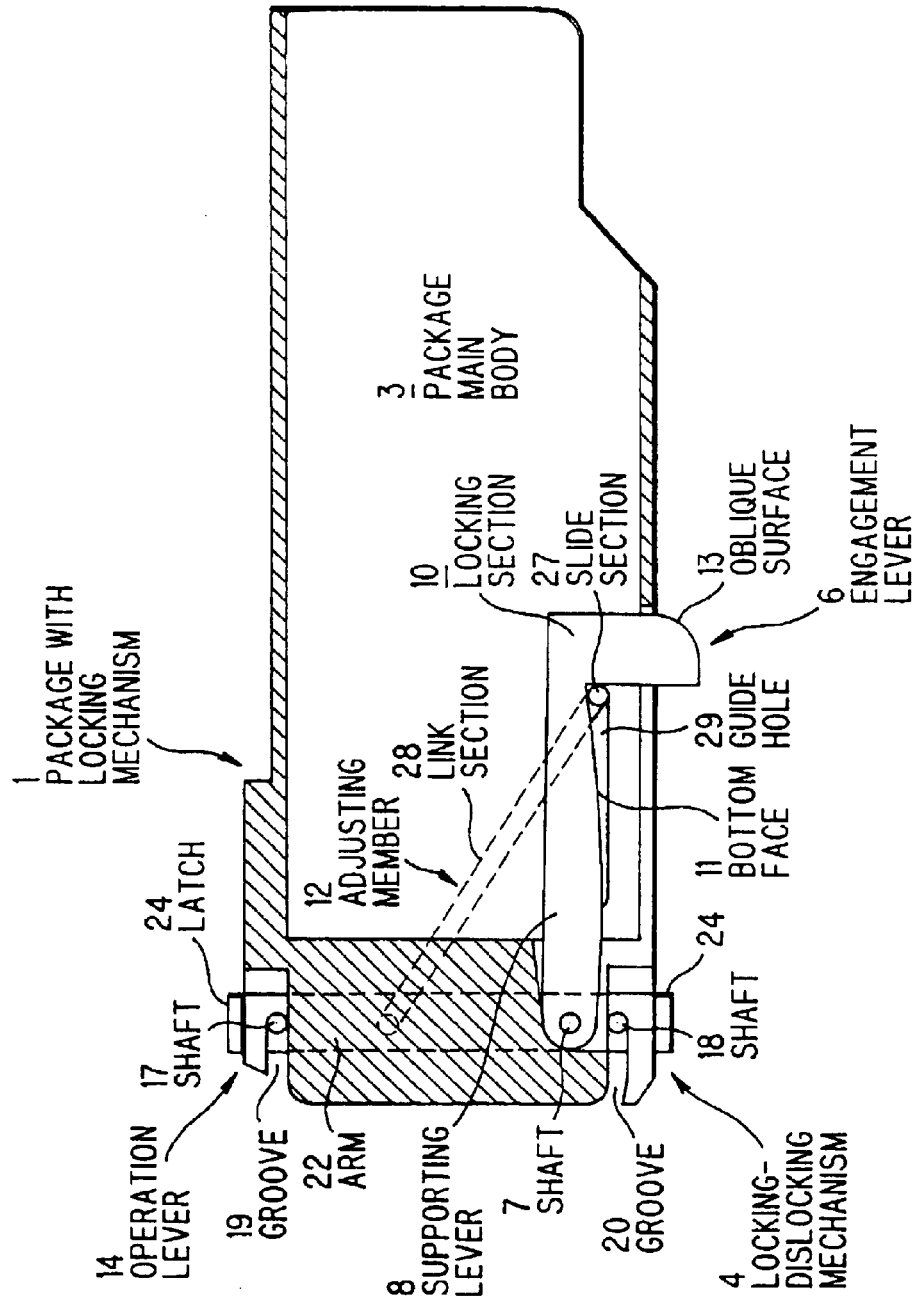
FIG. 12 is a side sectional view showing the package with the locking mechanism of FIG. 2.

As shown in FIGS. 2, 3, and 12, when a package 1 with locking mechanism fitted to a cage 2 is taken out from the cage, a user's finger hooks either of the shafts 17 and 18 exposed from either of the upper and lower notched sections 26, and pulls forwards a shaft selected. In this case, even if both the shafts 17 and 18 are erroneously pulled forwards at the same time, both the shafts 17 and 18 do never slip out from the inside of the grooves 19 and 20, besides the operation lever 14 are never disengaged with the package main body 3, because the grooves 19 and 20 are formed in circular arc sections, respectively.

Figure 6:
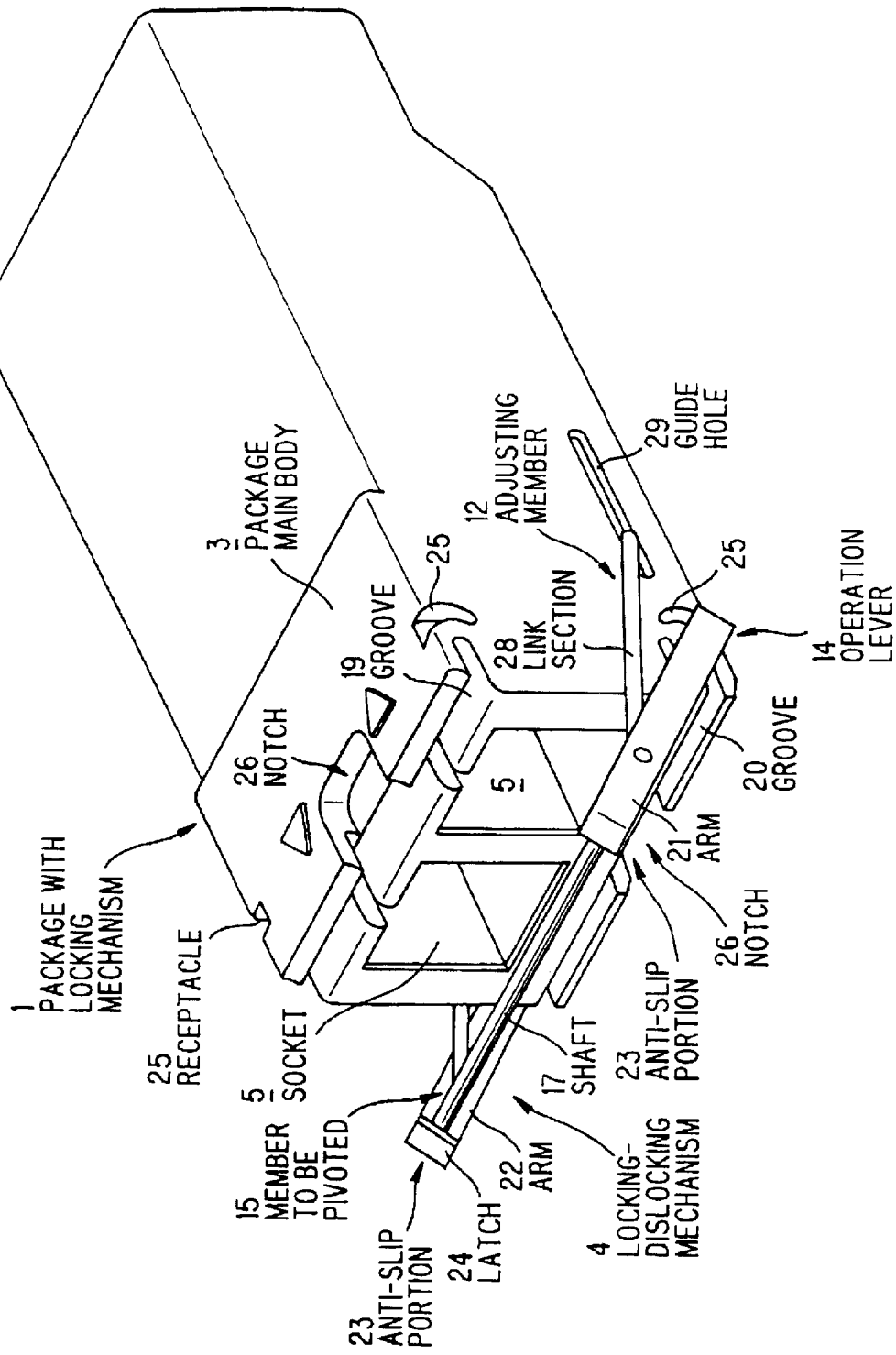
FIG. 6 is a perspective view showing the package with the locking mechanism wherein a dislocking operation is started.
Figure 7:
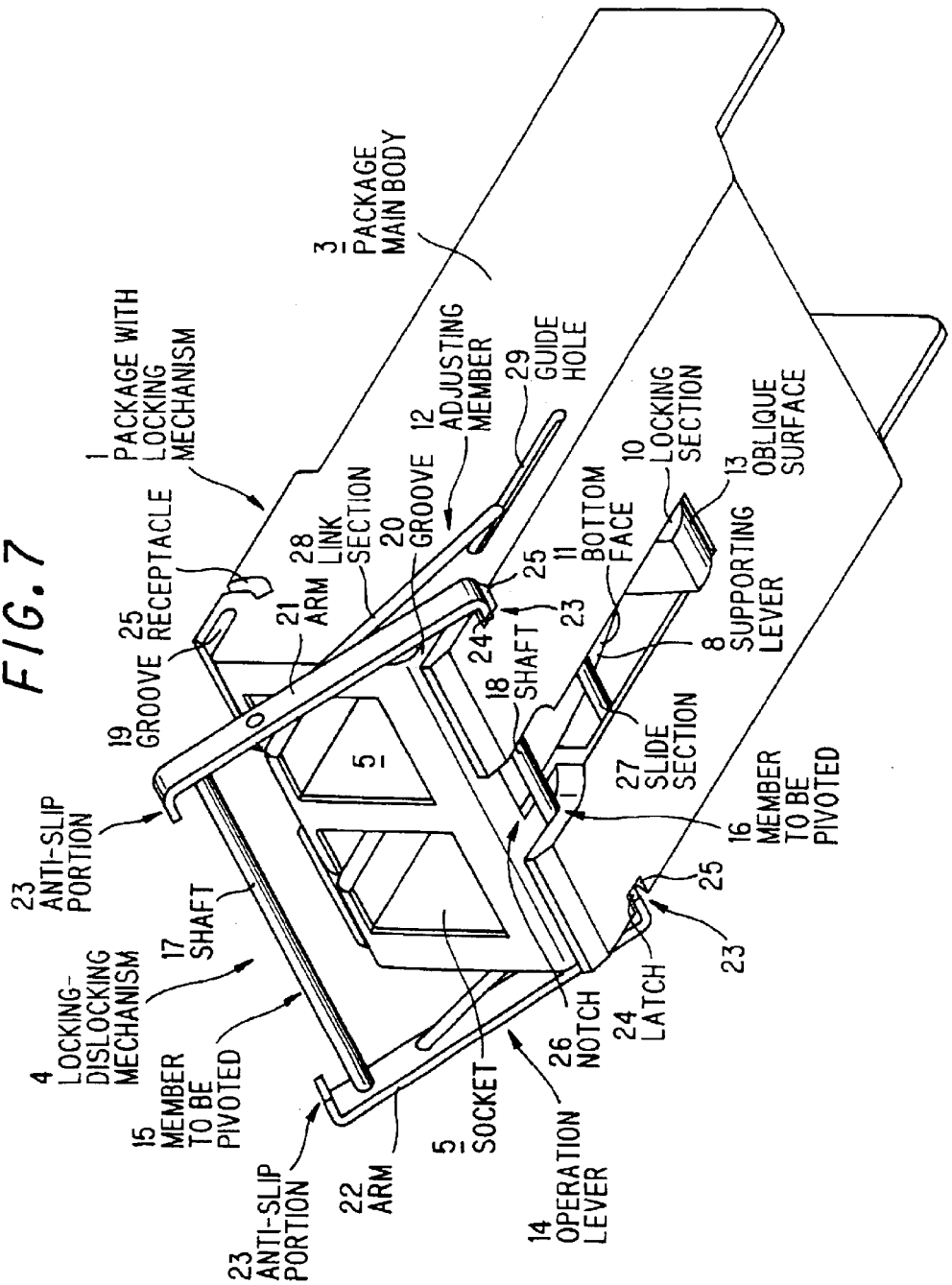
FIG. 7 is a perspective view showing the package with the locking mechanism wherein a dislocking operation is started.
Figure 13:
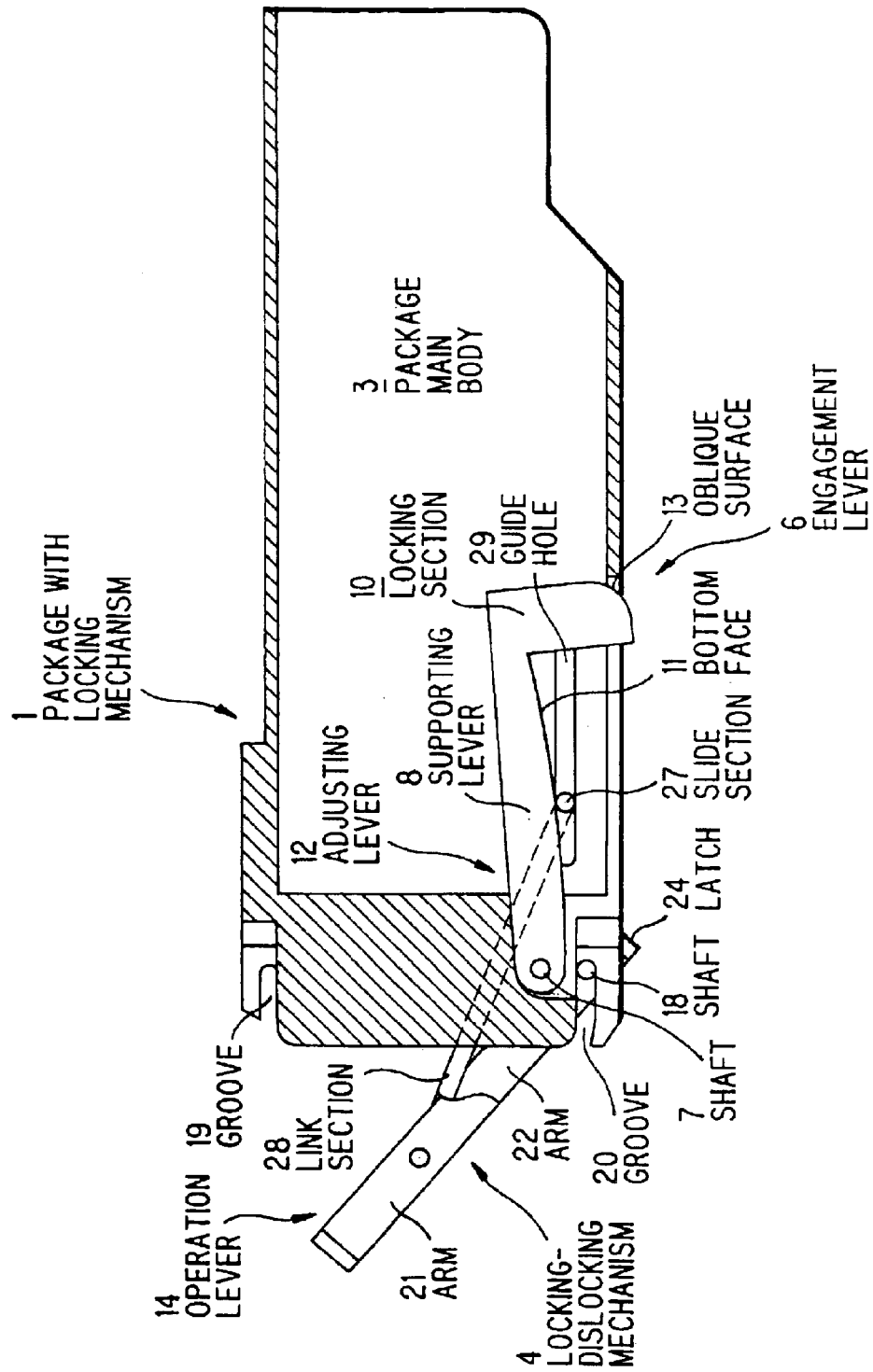
FIG. 13 is a side sectional view showing the package with the locking mechanism of FIG. 6.

As shown in FIGS. 6 and 13, when the shaft 17 on the upper side is pulled forwards, the operation lever 14 begins to rotate around the shaft 18 on the lower side as the center of rotation. When the operation lever 14 begins to rotate, the latches 24 of the arms 21 and 22 enter in the receptacles 25, respectively, so that the operation lever 14 can only rotate around the shaft 18 with respect to the package main body 3. For this reason, even when the shaft 17 on the upper side is disengaged with the groove 19, the operation lever 14 do never slip out from the package main body 3.

Due to rotation of the operation lever 14, the slide section 27 linked through the link section 28 to the operation lever 14 slides forwards in operating together with the operation lever 14 while receiving to restrict its sliding direction by means of the guide holes 29. Thus, the slide section 27 pushes up the supporting lever 8 to rotate upwards the engagement lever 6 while maintaining contact with the lower surface of the supporting lever 8. In this connection, a curvature of the bottom surface 11 is formed in a sufficiently gradual contour, so that a force in moving the slide section 27 becomes extremely small. As a result, the force received by the adjusting member 12 or the engagement lever 6 comes to be small, so that such members are hardly broken.

Figure 8:
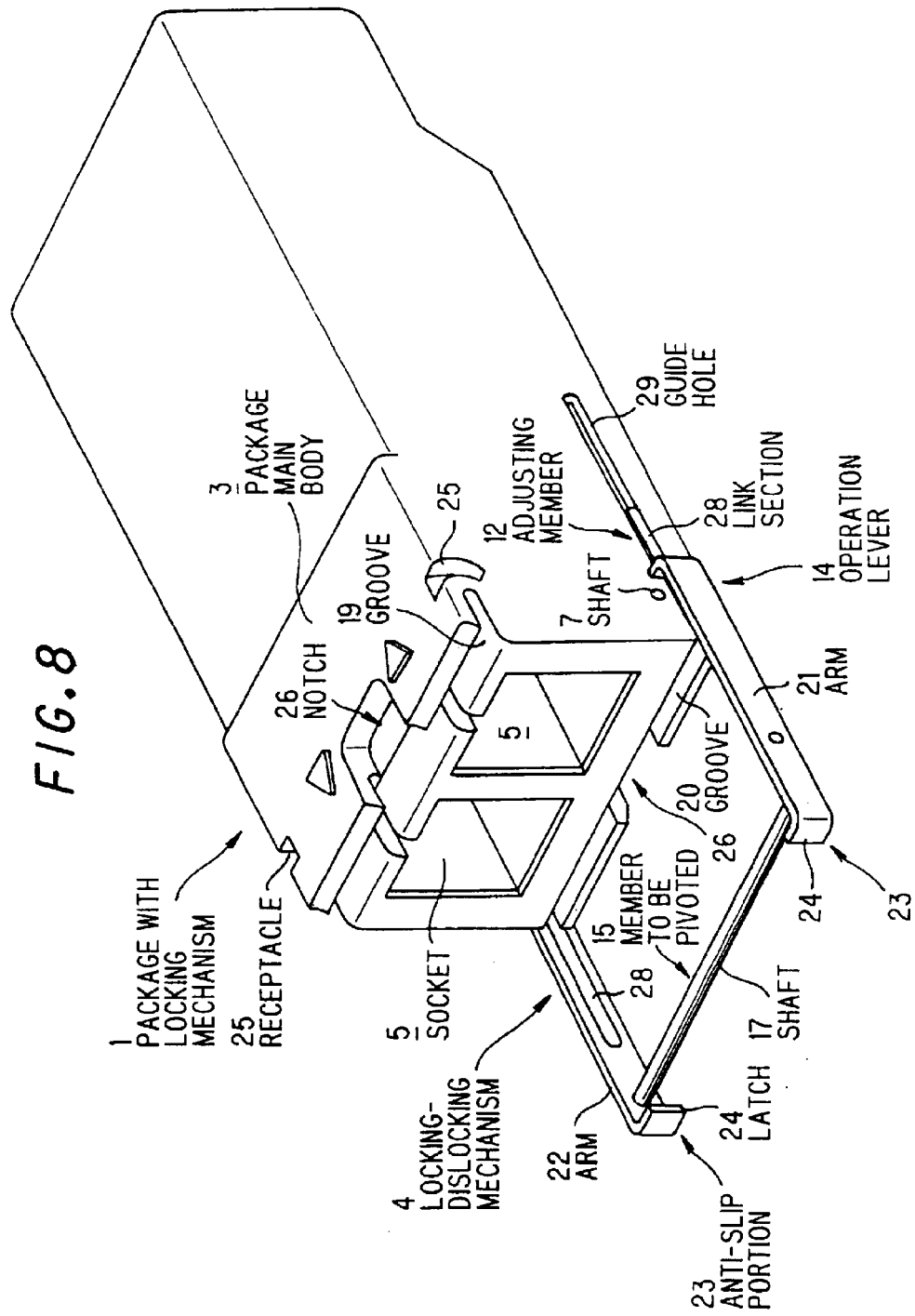
FIG. 8 is a perspective view showing the dislocked package with the locking mechanism.
Figure 9:
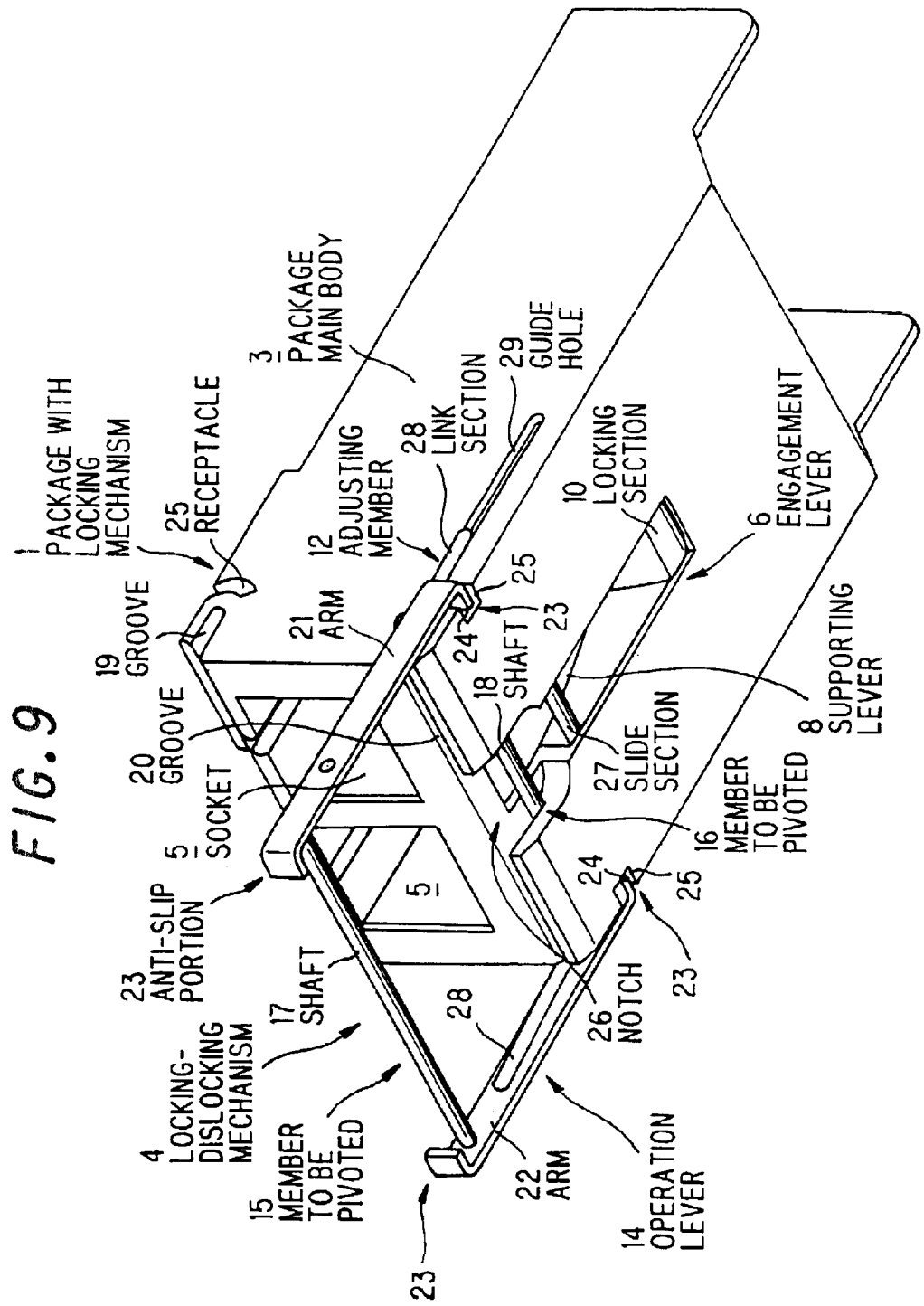
FIG. 9 is a perspective view showing the dislocked package with the locking mechanism.
Figure 14:
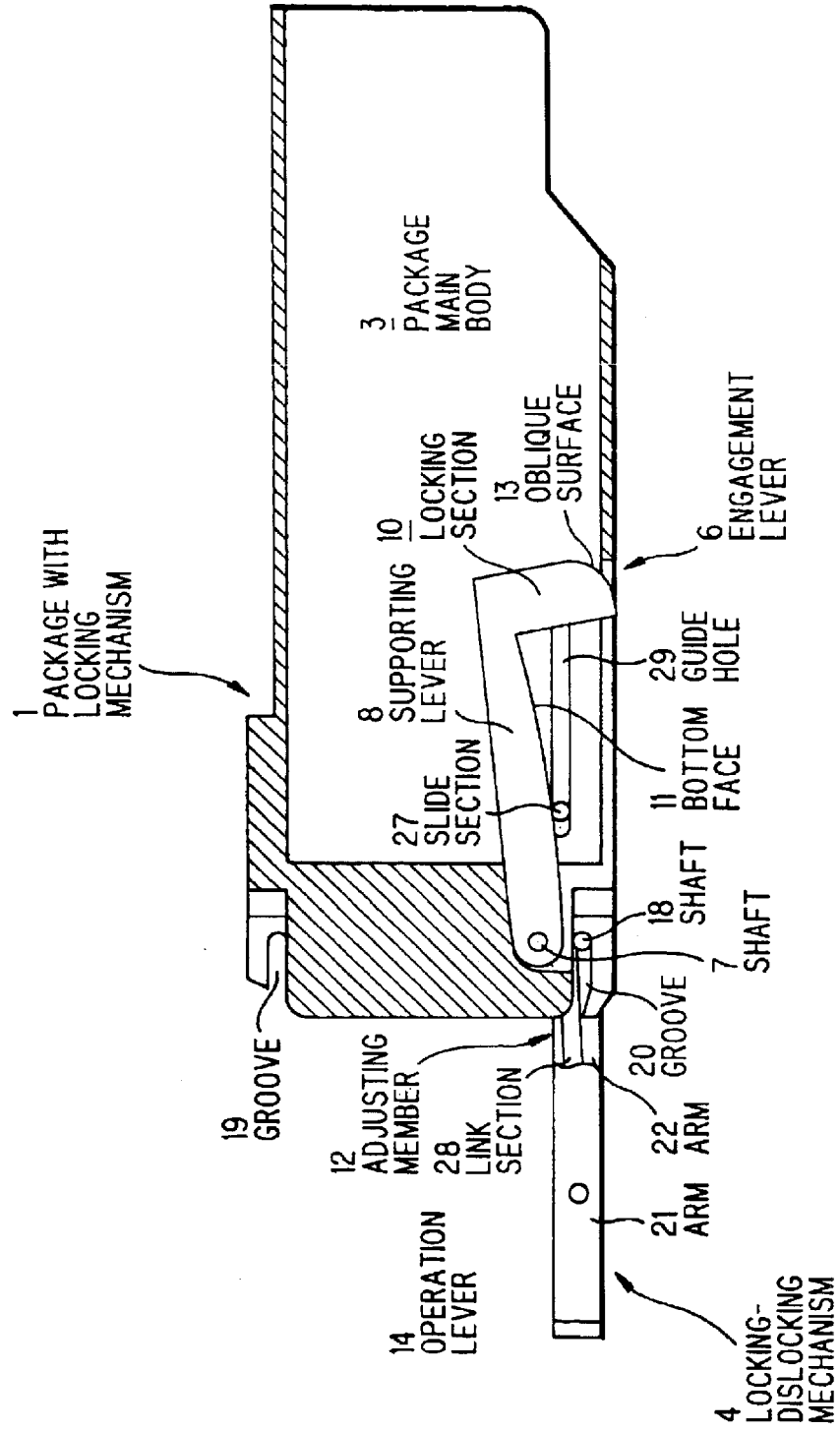
FIG. 14 is a side sectional view showing the package with the locking mechanism of FIG. 8.

As shown in FIGS. 8, 9, and 14, when the operation lever 14 is inclined forwards almost perfect and the locking section 10 in the engagement lever 6 is picked up upwards from the engagement hole 9 in the cage 2, a locked state is released. In this condition, when the operation lever 14 is pulled forwards, the package 1 with locking mechanism can be easily taken out.

Figure 10:
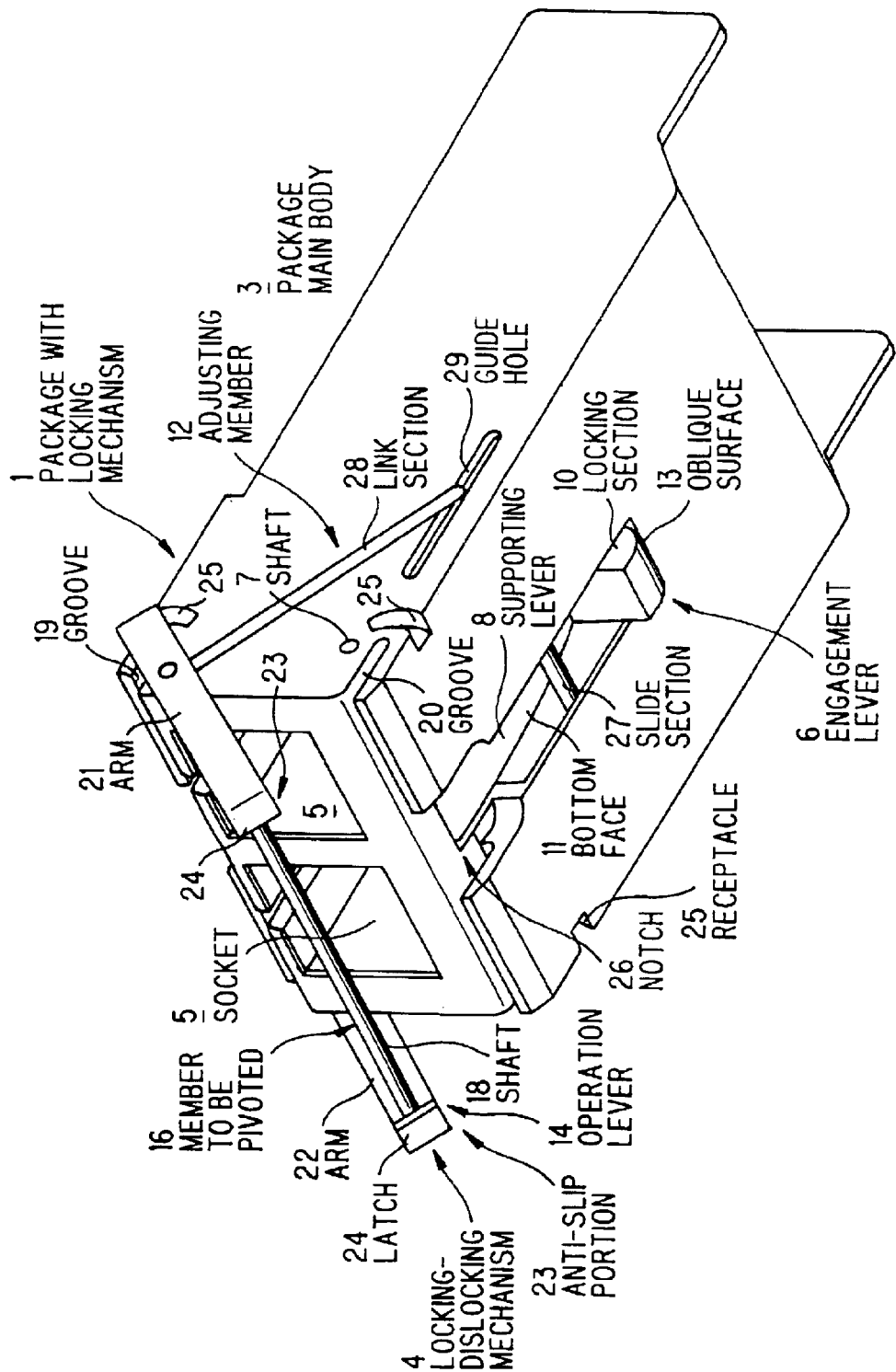
FIG. 10 is a perspective view showing the package with the locking mechanism wherein a dislocking operation is started.
Figure 11:
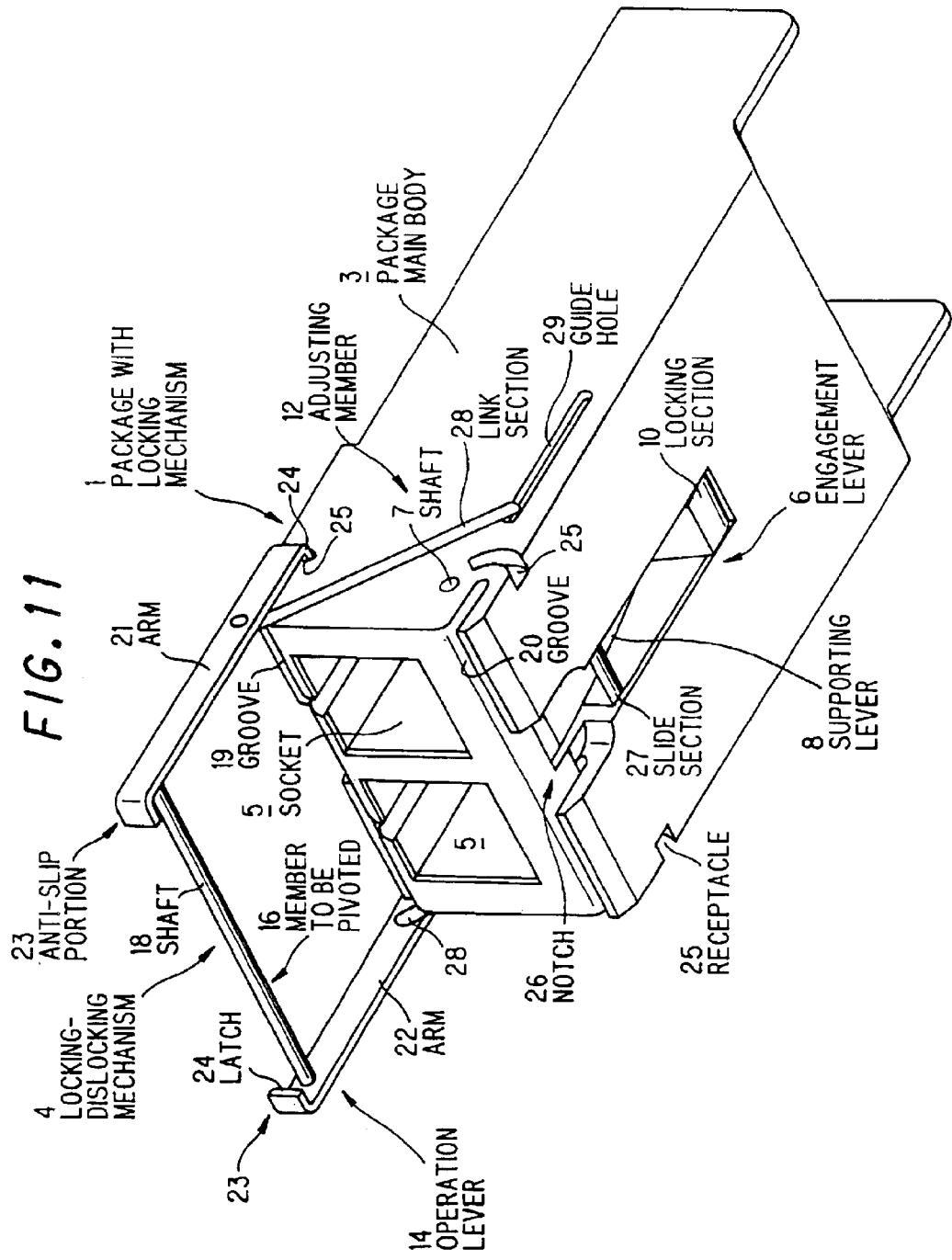
FIG. 11 is a perspective view showing the dislocked package with the locking mechanism.
Figure 15:
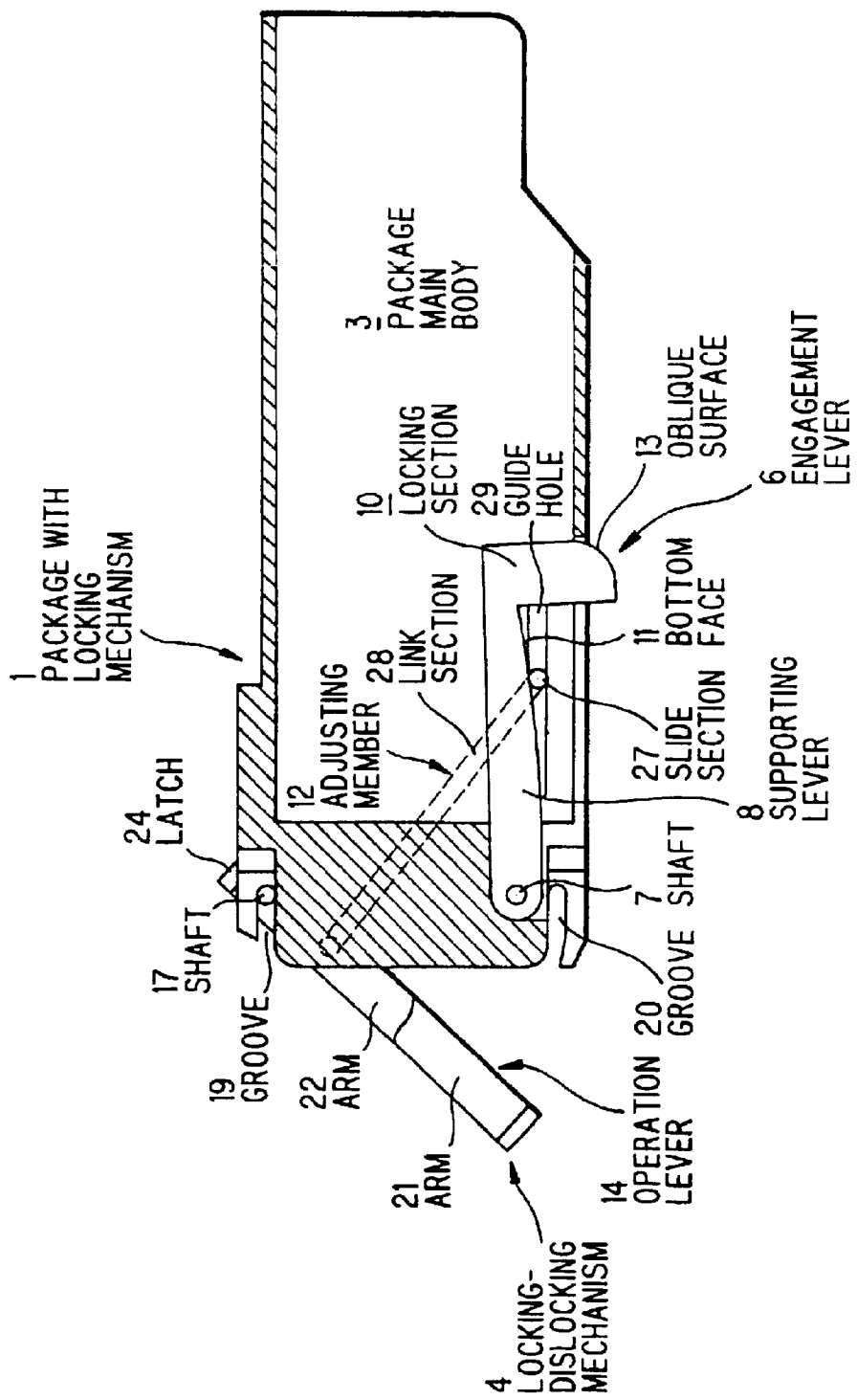
FIG. 15 is a side sectional view showing the package with the locking mechanism of FIG. 10.
Figure 16:
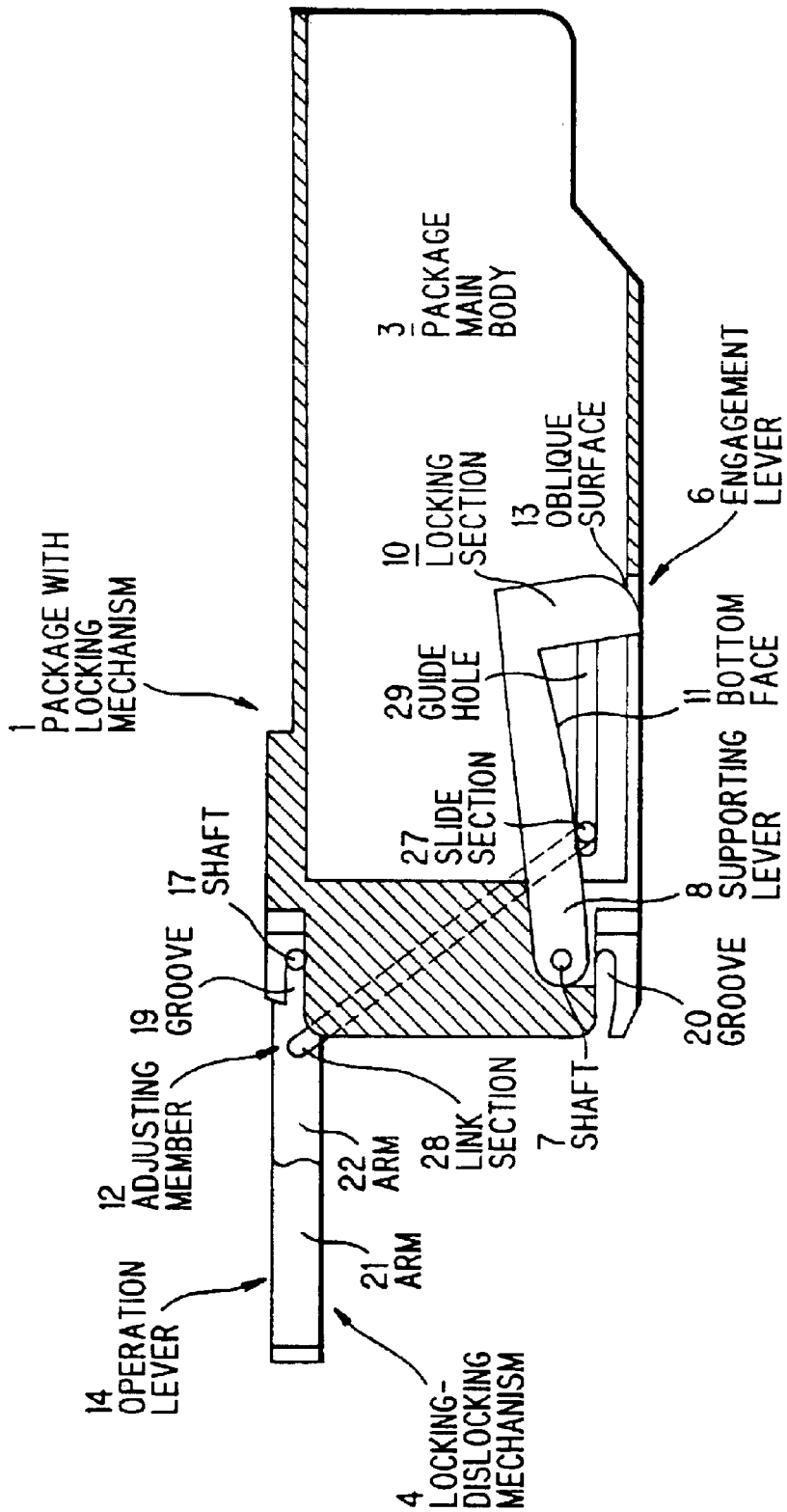
FIG. 16 is a side sectional view showing the package with the locking mechanism of FIG. 11.

In the case where a user's finger is difficult to hook the shaft 17 on the upper side, the shaft 18 on the lower side may be pulled forwards as shown in FIGS. 10 and 15. In this case also, when the operation lever 14 is rotated, the slide section 27 slides forwards in operating together with the operation lever 14. Accordingly, the engagement lever 6 is allowed to rotate upwards to release a locked state as shown in FIGS. 11 and 16. In this occasion, a movable direction of the operation lever 14 is restricted, because latches 24 in the arms 21 and 22 enter the receptacles 25 as in the case of the above-mentioned embodiment. Hence, even if the shaft 18 on the lower side is disengaged with the groove 20, the operation lever 14 do never slip out from the package main body 3.

In the case when the package with locking mechanism 1 is fitted to the cage 2, a posture of the operation lever 14 is returned to the original position to stand it, and the package main body 3 is inserted into the cage 2. Thus, the engagement lever 6 is allowed to abut the oblique surface 13 formed on the extreme end of the locking section 10 upon the front edge of the cage 2, and the engagement lever 6 escapes upwards. As a result, the locking section 10 reaches a position of the engagement hole 9, so that the locking section 10 is allowed to drop the locking section 10 in the engagement hole 9. Thus, the package 1 with locking mechanism is locked by the cage 2.

As described above, according to the present invention, the operation lever 14 is constituted to have two sections to be pivoted 15 and 16 being pivoted detachably by the package main body 3, and either of the sections to be pivoted 15 and 16 selected appropriately is pivoted by the package main body 3 to rotate the section selected. Therefore, a release operation of a package main body from a cage can be made easily by user's finger(s) by selecting optionally the upper or the lower section to be pivoted when a user hooks the operation lever 14 by his (or her) finger(s).

Moreover, the sections to be pivoted 15 and 16 are served for the shafts 17 and 18 for constituting a center of rotation of the operation lever 14, and the grooves 19 and 20 for retaining detachably the shafts 17 and 18 in their diametrical directions are defined on the package main body 3. As a result, according to the present invention, the operation lever 14 itself and a supporting structure therefor can be made simple.

Still further, according to the present invention, since the grooves 19 and 20 are constituted so as to have circular arc sections curved in a turned manner with each other, either one of the shafts 17 and 18 can be disengaged with the grooves 19 and 20 in only when the operation lever 14 rotates about another of the shafts 18 and 17 as the center of rotation, so that it makes possible to prevent disengagement of the shafts 17 and 18 with the package main body 3 at the same time.

According to the present invention, since the shafts 17 and 18 are served also for handles, the operation lever 14 may have a simple and easy structure.

Since notched sections 26 are defined in the package main body 3 for hooking the shafts 17 and 18 in the grooves 19 and 20 by a user's finger, the user can easily hook the shaft 17 or 18 by his (or her) finger, so that it makes easy to release a package main body from a cage according to the present invention.

Furthermore, according to the present invention, the operation lever 14 is provided with latches 24 engaged with the package main body 3 when the operation lever 14 is rotated around either of the shafts 17 and 18 as the center of rotation, while the package main body 3 is provided with the receptacles 25 for guiding the latches 24 to maintain the center of rotation of the operation lever 14. As a consequence, it is assured to prevent slipping-out of the shafts 17 and 18 from the grooves 19 and 20 when the operation lever 14 rotates with a simple and easy structure, resulting in favorable pivoting of the operation lever 14.

According to the present invention, an operation lever 14 is pivoted tiltably towards a taking-out direction of a package main body 3, an engagement lever 6 locked fastenably and releasably to a cage 2 is fitted rotatably to the package main body 3, and an adjusting member 12 for rotating the engagement lever 6 so as to disengage with the cage 2 when the operation lever 14 is tilted is disposed to the operation lever 14. Therefore, when the operation lever 14 is tilted, a locking section 10 in the engagement lever 6 can be taken out from an engagement hole 9. In this condition, when the operation lever 14 is pulled forwards, the package main body 3 can be easily picked out.

According to the present invention, an adjusting member 12 is linked rotatably at a position defined between sections to be pivoted 15 and 16 of an operation lever 14, besides it is engaged slidably with an engagement lever 6, so that it is possible to prevent addition of excessive force to the operation lever 14, the adjusting member 12, and the engagement lever 6 during operation. Hence, a locking-dislocking mechanism 4 in a package 1 with locking mechanism can be made hardly broken, so that dimensional accuracy in the adjusting member 12 and the engagement lever 6 may be liberalized.

In the above-described embodiments, although the operation lever 14 has two sections to be pivoted 15 and 16, such sections may be more than two.

Moreover, although the grooves 19 and 20 are formed circular arc sections, respectively, in the above-described embodiments, it may be formed in a hooked section.

Figure 17:
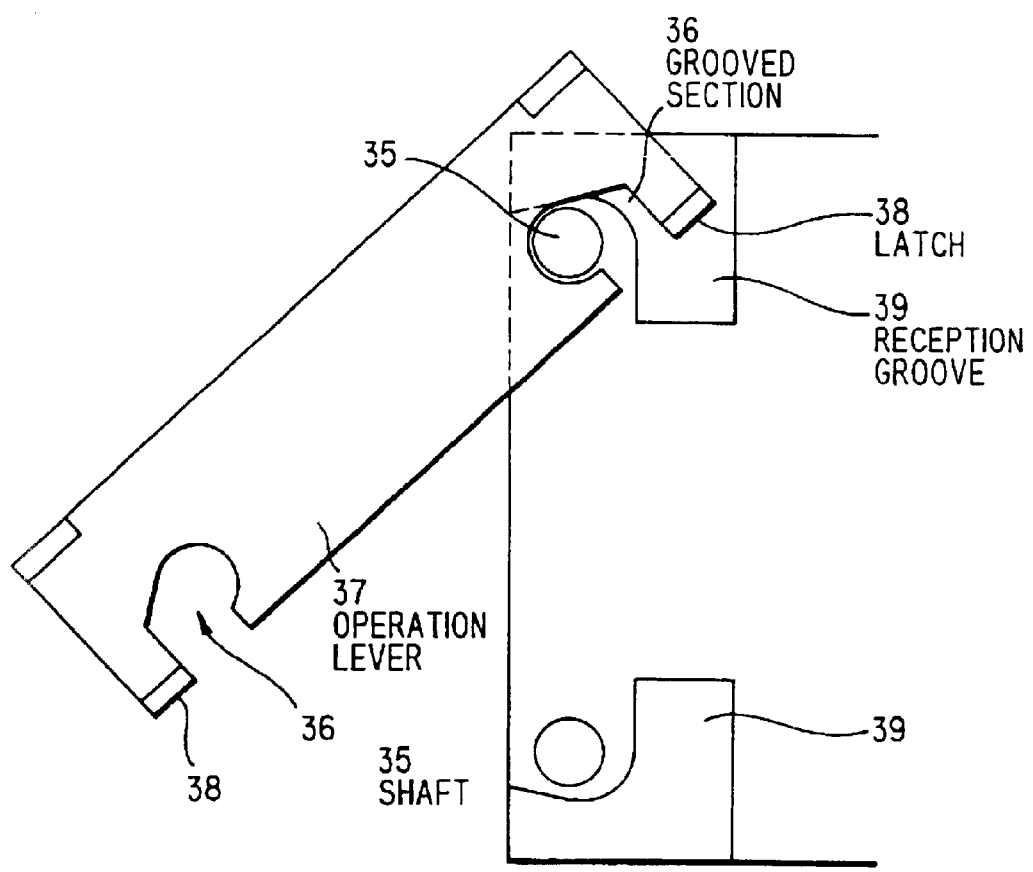
FIG. 17 is a schematic explanatory view showing a package with a locking mechanism according to another embodiment of the present invention.

Although shafts 17 and 18 being sections to be pivoted 15 and 16 are retained disengeably in the grooves 19 and 20 defined in the package main body 3 along the diametrical direction in the present embodiments, the present invention is not limited thereto. For instance, as shown in FIG. 17, shafts 35 each extending in a width direction of a cage are defined on a package main body 3 in place of the grooves 19 and 20, and grooved sections 36 each surrounding disengageably the outer circumference of an shaft 35 in its diametrical direction may be defined as sections to be pivoted, respectively. In this case, a grooved section 36 is defined desirably in a curved contour so as not to be interfered with a shaft 35 situated in the other grooved section 36 defined on the opposite side of an operation lever 37 when the former grooved section 36 is rotated around the former shaft 35. More specifically, the grooved sections 35 may be defined so as to have circular arc or hooked sections which are curved with a turned relationship with each other. In this case, it is preferred that the operation lever 37 has latches 38 each of which engages with the package main body 38 when the operation lever 37 rotates around either of the shafts 35 as the center of rotation, while the package main body 3 has reception grooves 39 for guiding the latches 38 so as to maintain the center of rotation of the operation lever 37.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A package with a locking mechanism comprising:
   a package main body to be inserted into and removed from a cage and locked fastenably and releasably with the cage;
   a locking-dislocking mechanism for locking and dislocking the package main body with the cage; and
   an operation lever for the locking-dislocking mechanism, the locking-dislocking mechanism being attached to the package main body, the operation lever having a plurality of members to be pivoted detachably on the package main body wherein any one of the members to be pivoted which is selected arbitrarily therefrom being pivoted on the package main body so as to rotate the operation lever.

2. The package with the locking mechanism as defined in claim 1, wherein:
   the any one member to be pivoted comprises a shaft functioning as the center of rotation in the operation lever; and
   the package main body has a retaining groove for retaining releasably the shaft in the diametrical direction thereof.

3. The package with the locking mechanism as defined in claim 2, wherein:
   a notched section for hooking the shaft in the groove by a user's finger is defined on the package main body.

4. The package with the locking mechanism as defined in claim 2, wherein:

the operation lever has a latch engaged with the package main body when the operation lever rotates about the shaft, and the package main body has a reception groove for guiding the latch so as to maintain the center of rotation in the operation lever.

5. The package with the locking mechanism as defined in claim 2, wherein:

the retaining grooves are formed into circular arc or hooked sections being curved in a turned relationship, respectively.

6. The package with the locking mechanism as defined in claim 5, wherein:

a notched section for hooking the shaft in the groove by a user's finger is defined on the package main body.

7. The package with the locking mechanism as defined in claim 1, wherein:

the any one member to be pivoted is configured in a form of a grooved section surrounding a shaft attached to the package main body in a releasable manner along the diametrical direction thereof.

8. The package with the locking mechanism as defined in claim 7, wherein:

the grooved sections are formed into circular arc or hooked sections being curved in a turned relationship, respectively.

9. The package with the locking mechanism as defined in claim 1, further comprising:

an engagement lever locked fastenably and releasably to the cage to be disposed rotatably to the package main body; and an adjusting member to be attached to the operation lever, the adjusting member rotating the engagement lever so as to release from the cage when the operation lever is tilted;

wherein the operation lever is pivoted tiltably in a direction of taking out the package main body.

10. The package with the locking mechanism as defined in claim 9, wherein:

the adjusting member is rotatably linked at a position defined between the members to be pivoted in the operation lever, and the adjusting member is engaged slidably with the engagement lever.

* * * * *